April 15, 1952    D. GRIMLEY    2,592,889
SCREW AND NUT MECHANISM
Filed Feb. 20, 1950
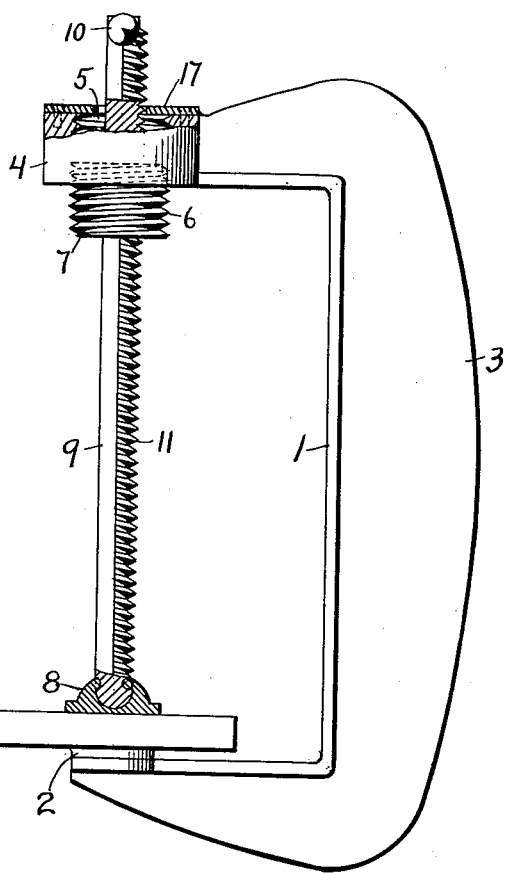
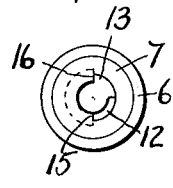
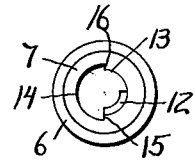
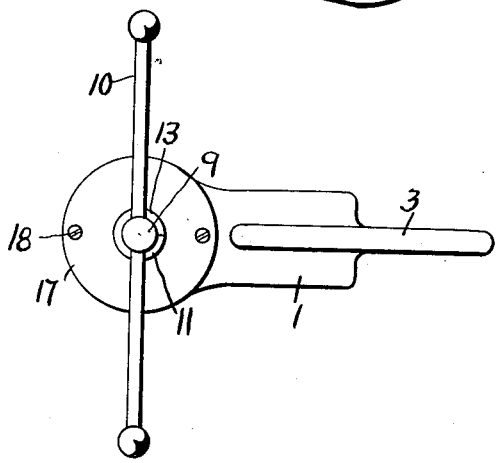
Inventor
David Grimley
By
K.M.Thorpe
Attorney Patented Apr. 15, 1952

2,592,889

UNITED STATES PATENT OFFICE 2,592,889

SCREW AND NUT MECHANISM

David Grimley, Kansas City, Mo.

Application February 20, 1950, Serial No. 145,155

3 Claims. (Cl. 74—424.8)

1

This invention relates to quick-acting mechanisms for use with C-clamps, micrometers, vises and similar structures, the general object being to provide a device where the clamping pressure will be released gradually rather than suddenly released which permits forcible projection of the clamp screw. Where substantial pressure or strain is instantly released the work may pop out of position, the clamp may jump out of the operator's hand, etc., any of which may damage the work or injure the operator. The objects of the invention are accomplished by a reverse threading of the parts as will hereinafter more particularly appear.

Another object of the invention is to produce a quick-acting device which is not limited to one or two turns of the mutilated threaded member for the application of clamping pressure. The device of the present invention, on the other hand, may be designed to apply clamping pressure requiring extended longitudinal travel so that a kink or bend may be taken out of a work piece to be straightened without a resetting of the clamp.

With the general objects named in view and others as will hereinafter appear, the invention consists in certain novel and useful features of construction and organization of parts as hereinafter described and claimed; and in order that it may be fully understood, reference is to be had to the accompanying drawing, in which:

Figure 1 is a side elevation of a C-clamp embodying the invention, the device being partially broken away to show a fragment in central vertical section.

Figure 2 is a top plan view of the device shown in Figure 1, but with the work omitted.

Figure 3 is a cross section through the mutilated clamp screw.

Figure 4 is an end view of the travelling clamp sleeve which is internally and externally reversely threaded.

Figure 5 is an end view of the clamp sleeve as it may appear in process of manufacture.

In the said drawing, where like reference characters identify corresponding parts in all of the figures, 1 is the frame of a C-clamp provided at one end with a clamping anvil 2, receiving the work W. The frame is reinforced by a rib 3 and at its upper end terminates in a head 4 which is internally threaded with a right-hand thread 5 as illustrated.

The internal threads 5 of the head 4 are engaged with the external threads 6 of a tubular clamp sleeve 7. For purposes of illustration the threads 5 and 6 are shown as right-hand, that is when sleeve 7 is rotated to the right, the sleeve will travel down toward the anvil 2. Adapted for longitudinal travel through a threaded bore in the sleeve 7, is a clamp screw 9 having a swivelled clamp foot 8 at its lower end and a clamping handle 10 at its upper end. The screw 9 is formed for substantially its full length with a mutilated thread 11 which is the reverse of the threads 5 and 6, namely, as illustrated, a left-hand thread.

The thread 11 is shown as extending through an arc of 90° on the screw 9, but this length is subject to change as it is a matter of design to meet contemplated loads, the balance of the thread being broached or otherwise cut away down to the plane of the root of thread 11 by preference. In order to cooperate with the clamp screw 9 and its mutilated thread 11, the sleeve 7 is formed with a central bore, divided into the following sections, in the proportions chosen for illustration: an arc of 90°, having a left-hand thread 12 to enmesh with the left-hand thread 11; an arc of 90° broached or otherwise cut away on a radius slightly exceeding that of the root of thread 12, to provide an open space or area 13 through which the thread 11 of screw 9 may freely reciprocate for quick-setting purposes; and an unthreaded area of 180° struck on a radius slightly greater than the crest of thread 12 whereby shoulders 15 and 16 are provided for abutment with the ends of the thread 11.

One convenient means of making the internal bore is to cut continuous threads 12 and then broach them away to provide an area 13, the other 180° being broached as at 14 in Figure 5. This broached area may now be filled with an unthreaded section shown in dotted lines in Figure 4, which may be sweated into position. Or the unthreaded section shown in dotted lines, Figure 4, may be formed by filling the threads with hot metal or otherwise.

In those constructions where it may be undesirable to have the sleeve unscrew out of the top of the head 4, the outward movement may be limited by an abutment plate 17 held by screws 18 to the face of said head as shown in Figures 1 and 2. In the proportions of the device illustrated, continuous clamping pressure may be applied a distance substantially equalling the length of the sleeve 7 as will hereinafter appear, without a resetting of the clamp.

With a clamp or vise such as shown, at the start of a clamping operation it is preferred the sleeve 7 be in abutment with plate 17 so that its full length will be available for clamping purposes if needed. Assuming sleeve 7 has been started from the position just indicated and work W has been positioned on anvil 2. The operator now lines up mutilated threads 11 with the space 13 in sleeve 7 and can thus quickly position the foot 8 in contact with work W. The operator now imparts right-hand rotation to screw 9 and threads 11 and 12 will enmesh if they happen to be in alignment. If these threads do not initially enmesh continued rotation of screw 9 will cause their abutting ends to rotate the sleeve 7. Under maximum misaligned conditions the resultant travel of the sleeve 7 a linear distance equal to the pitch of threads 11 and 12, will bring about alignment of said threads. Threads 11 now move into threads 12 and, assuming continued right-hand rotation of the screw 9, the enmesment of threads 11 and 12 will effect a backing away or release of pressure a linear distance corresponding to one-fourth of the pitch of threads 11 and 12 in the proportions illustrated. By this time, however, the ends of threads 11 will have contacted the fixed abutment 15. From this point on continued right-hand rotation of screw 9 causes rotation of sleeve 7 to clamp or compress the work W. In the drawing, it is assumed continued clamping pressure has been applied to compress the work the linear distance between the upper dotted end of the sleeve 7 and the abutment plate 17, Figure 1.

Assume the work W is under tension in Figure 1 and the clamp is to be released. With the mutilated screw devices of the prior art, this clamping strain is instantly, rather than gradually, released. With the present invention, however, the following sequence of operations will occur, due to the reverse threaded relationship of the parts. If the pressure against the foot 8 has been such that the work has been clamped to the desired degree, left-hand rotation imparted to the screw 9 will tend to increase this pressure as threads 11 and 12 are left-hand, but since the desired limit of pressure has been reached, there will be no relative change in the position of threads 11 and 12 as they are in effect locked together. Thus left-hand motion is imparted to sleeve 7 to rotate same on threads 5 and 6 to gradually release the clamping strain by backing away foot 8. As soon as the pressure or strain has been released as described, mutilated thread 11 can be lined up with space 13 for quick release of work W. On the other hand, if the work W was not initially tightly clamped, threads 11 cannot be lined up with space 13 until travel against the work has been completed, when the above sequence of operations will occur. In other words as long as there is any load on the threads 11 and 12 they are locked against relative movement which might result in the forcible release of clamping strain.

From the above description and drawing it will be apparent that I have produced a device embodying all of the features of advantage set forth as desirable; and while I have described and illustrated the preferred construction, it is to be understood that I reserve the right to all changes within the spirit and scope of the appended claims.

I claim:

1. A quick-acting clamp comprising an internally threaded head, an externally threaded sleeve in threaded engagement with the head and formed with a bore having a section threaded reversely from its external threads, the internal bore through said sleeve, at opposite ends of its threaded section, terminating in an unthreaded arcuate section struck on a radius slightly greater than the crest of its threaded section and in an unthreaded arcuate section cut away on a radius slightly exceeding that of the root of its thread, respectively, and a clamp screw within the bore of the sleeve having a mutilated thread movable into and out of mesh with the mutilated thread of the sleeve.

2. A quick-acting clamp comprising an internally threaded head, an externally threaded sleeve in threaded engagement with the head and formed with a bore having a section threaded reversely from its external threads, the internal bore through said sleeve, at opposite ends of its threaded section, terminating in an unthreaded arcuate section struck on a radius slightly greater than the crest of its threaded section and in an unthreaded arcuate section cut away on a radius slightly exceeding that of the root of its thread, respectively, and a clamp screw within the bore of the sleeve having a mutilated thread movable into and out of mesh with the mutilated thread of the sleeve.

3. A quick-acting clamp comprising an internally threaded head, an externally threaded sleeve in threaded engagement with the head and formed with a bore having a section threaded reversely to its external threads and an unthreaded section adjoining the threaded section and struck on a radius slightly greater than the crest of its threaded section, and a screw having a mutilated threaded section extending through said bore with its threads movable into and out of engagement with the threads of the sleeve, said bore having an additional unthreaded arcuate section cut away on a radius slightly exceeding that of the root of its threaded section.

DAVID GRIMLEY.

REFERENCES CITED

The following references are of record in the file of this patent:

UNITED STATES PATENTS

| Number | Name | Date |
|---|---|---|
| 754,962 | Bennett | Mar. 22, 1904 |
| 783,845 | Munro | Feb. 28, 1905 |
| 898,604 | Rivers | Sept. 15, 1908 |
| 978,900 | Kirkpatrick | Dec. 20, 1910 |
| 1,045,745 | Raes | Nov. 26, 1912 |
| 1,382,247 | Schafer | June 21, 1921 |
| 2,138,245 | Smith | Nov. 29, 1938 |
| 2,247,562 | Santen | July 1, 1941 |
| 2,338,271 | Ulanet | Jan. 4, 1944 |
| 2,372,727 | Manning | Apr. 3, 1945 |

FOREIGN PATENTS

| Number | Country | Date |
|---|---|---|
| 418,391 | Great Britain | Oct. 24, 1934 |